(12) United States Patent
Kato et al.

(10) Patent No.: US 8,372,363 B2
(45) Date of Patent: Feb. 12, 2013

(54) METHOD OF MERCURY REMOVAL FROM COMBUSTION EXHAUST GAS AND COMBUSTION EXHAUST GAS PURIFICATION APPARATUS

(75) Inventors: Yasuyoshi Kato, Hiroshima (JP); Keiichiro Kai, Hiroshima (JP); Seiji Ikemoto, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/142,954

(22) PCT Filed: Dec. 13, 2010

(86) PCT No.: PCT/JP2010/007218
§ 371 (c)(1),
(2), (4) Date: Jun. 30, 2011

(87) PCT Pub. No.: WO2011/074230
PCT Pub. Date: Jun. 23, 2011

(65) Prior Publication Data
US 2011/0268638 A1 Nov. 3, 2011

(30) Foreign Application Priority Data
Dec. 14, 2009 (JP) .................................. 2009-283337

(51) Int. Cl.
*B01D 53/50* (2006.01)
*B01D 53/56* (2006.01)
*B01D 53/64* (2006.01)
*B01D 53/75* (2006.01)
*B01D 53/74* (2006.01)

(52) U.S. Cl. ...................... 423/210; 423/235; 423/239.1; 423/243.01; 423/240 R; 423/215.5; 422/168; 422/169; 422/170; 422/172; 422/177; 422/105; 422/111

(58) Field of Classification Search .................. 423/210, 423/235, 239.1, 243.01, 240 R, 215.5; 422/168, 422/169, 170, 172, 177, 105, 111
See application file for complete search history.

(56) References Cited

U.S. PATENT DOCUMENTS
2011/0268638 A1* 11/2011 Kato et al. ................. 423/239.1

FOREIGN PATENT DOCUMENTS
JP 07-031847 A 3/1995
JP 10-230137 A 2/1998
(Continued)

OTHER PUBLICATIONS
International Search Report for PCT/JP2010/007218 dated Mar. 22, 2011.

*Primary Examiner* — Timothy Vanoy
(74) *Attorney, Agent, or Firm* — Heslin Rothenberg Farley & Mesiti P.C.

(57) ABSTRACT

A method for removing mercury in a combustion exhaust gas includes injecting ammonia or urea as a reducing agent into a combustion exhaust gas containing nitrogen oxides, sulfur dioxide, metallic mercury, and hydrogen halides, and then introducing the combustion exhaust gas to a denitration apparatus filled with a denitration catalyst to cause a denitration reaction and oxidize the metallic mercury to produce mercury halide; and introducing the combustion exhaust gas through an air preheater and an electric dust collector to a wet desulfurization apparatus, thereby removing sulfur dioxides and the mercury halide, wherein the ammonia concentration of the combustion exhaust gas at an exit of the denitration apparatus is maintained at 5 ppm or higher, and the mercury halide is adsorbed or precipitated onto combustion ash and collected by the electric dust collector to discharge the mercury halide out of a system.

4 Claims, 3 Drawing Sheets

FOREIGN PATENT DOCUMENTS

| | | |
|---|---|---|
| JP | 3354660 B2 | 12/2002 |
| JP | 2004-337781 A | 2/2004 |
| JP | 2005-516753 A | 9/2005 |
| JP | 2008-238057 A | 10/2008 |
| JP | 2009-028656 A | 2/2009 |
| WO | 2009/031234 A1 | 3/2009 |

\* cited by examiner

FIG. 3

| ITEM | VALUE |
| --- | --- |
| 1. GAS COMPOSITION | |
| $NO_X$ | 300 ppm |
| $NH_3$ | 360 ppm |
| $SO_2$ | 1000 ppm |
| $O_2$ | 3% |
| $CO_2$ | 12% |
| $H_2O$ | 12% |
| Hg | 10 ng/Liter |
| HCl | 30 ppm |
| 2. GAS FLOW RATE | 3 Liters/Min |
| 3. TEMPERATURE | 150°C |
| 4. LOADED AMOUNT OF CATALYST | THREE 20 mm WIDE × 100 mm (OVERALL LENGTH) SHEETS |

FIG. 4

|  | EXIT OF CATALYST NH$_3$ (ppm) | Hg PRECIPITATED AT QUARTZ TUBE (ng) | Hg IN ABSORBING SOLUTION (GASEOUS Hg) (ng) |
| --- | --- | --- | --- |
| PRACTICAL EXAMPLE 1 | 61 | 15.3 | 1.2 |
| COMPARATIVE EXAMPLE 1 | 0 | 0.25 | 17.2 |

FIG. 5

|  | EXIT OF CATALYST NH$_3$ (ppm) | Hg PRECIPITATED AT QUARTZ TUBE (ng) | Hg IN ABSORBING SOLUTION (GASEOUS Hg) (ng) |
| --- | --- | --- | --- |
| PRACTICAL EXAMPLE 2 | 65 | 14.1 | 1.9 |
| PRACTICAL EXAMPLE 3 | 32 | 14 | 2.1 |
| PRACTICAL EXAMPLE 4 | 7 | 12.8 | 4.6 |
| PRACTICAL EXAMPLE 5 | 5 | 9.3 | 7.8 |
| COMPARATIVE EXAMPLE 2 | 2 OR LOWER | 1.2 | 16.8 |

METHOD OF MERCURY REMOVAL FROM COMBUSTION EXHAUST GAS AND COMBUSTION EXHAUST GAS PURIFICATION APPARATUS

Cross Reference to Related Applications

This application is a national stage filing under section 371 of International Application No. PCT/JP2010/007218, filed on Dec. 13, 2010, and published in Japanese on Jun. 23, 2011, as WO 2011/074230 A1 and claims priority of Japanese application No. JP2009-283337filed on Dec. 14, 2009, the entire disclosure of these applications being hereby incorporated herein by reference.

TECHNICAL FIELD

The present invention is concerned with a technique to remove mercury in a combustion exhaust gas containing nitrogen oxides and sulfur oxides and relates, more particularly, to a technique to convert mercury into a mercury halide and remove the mercury halide by a dust-collecting apparatus.

BACKGROUND ART

Patent Literature 1, for example, proposes adding an equivalent or larger amount of ammonia for reaction with nitrogen oxides in a combustion exhaust gas containing nitrogen oxides and sulfur oxides produced when coal is burned, as a reducing agent, to the combustion exhaust gas, thereby reducing the nitrogen oxides in the combustion exhaust gas in the presence of a denitration catalyst. Consequently, the combustion exhaust gas containing unreacted ammonia is introduced to a wet desulfurization apparatus on the downstream side of the denitration catalyst. The patent literature describes that this unreacted ammonia serves as a desulfurizing auxiliary agent, and therefore, the desulfuration rate of the combustion exhaust gas can be improved. In the technique described in Patent Literature 1, however, no consideration is given to removing mercury in the combustion exhaust gas.

On the other hand, a technique to remove mercury in a combustion exhaust gas is proposed in Patent Literature 2. This patent literature proposes adding ammonia to a combustion exhaust gas containing metallic mercury and hydrogen chloride exhausted from a coal-fired boiler to reduce nitrogen oxides in the presence of a denitration catalyst and oxidize highly-volatile metallic mercury to mercury chloride, removing burned ash in the combustion exhaust gas by an electric dust collector, and then allowing the mercury chloride and sulfur oxides to be absorbed into an absorbing solution of an wet desulfurization apparatus, thereby removing the mercury chloride from the combustion exhaust gas along with calcium sulfate.

CITATION LIST

Patent Literature
Patent Literature 1: Japanese Patent No. 3354660
Patent Literature 2: International Publication No. WO 2009/031234

SUMMARY OF INVENTION

Technical Problem

However, the mercury removal technique described in Patent Literature 2 removes mercury by the wet desulfurization apparatus and is, therefore, problematic in that the rate of mercury removal is low. That is, the absorbing solution which has absorbed the sulfur oxides contains sulfite ions and these sulfite ions reduce the mercury chloride absorbed into the absorbing solution to metallic mercury. Thus, the technique has the problem that since the metallic mercury is highly volatile, the metallic mercury is released from the absorbing solution and is emitted while being mixed in the exhaust gas.

An object to be achieved by the present invention is to improve the rate of mercury removal in a combustion exhaust gas.

Solution to Problem

The inventors of the present invention have had the knowledge that adding a reducing agent so that unreacted ammonia remains in the reduction reaction of nitrogen oxides in a combustion exhaust gas enables the removal of an increased amount of mercury by a dust-collecting apparatus on the downstream side of a denitration catalyst. That is, mercury in the combustion exhaust gas is converted into monovalent and divalent mercury halides in the presence of the denitration catalyst. In this case, if the reducing agent is added so that an unreacted portion thereof remains, the monovalent mercury halide is produced in larger amounts than the divalent mercury halide. The monovalent mercury halide is lower in saturated vapor pressure than the divalent mercury halide and can be precipitated as a solid even at high temperatures. Consequently, mercury can be removed by the dust-collecting apparatus.

In order to solve the above-described problem on the basis of this knowledge, a method for removing mercury in a combustion exhaust gas according to the present invention comprises: injecting ammonia or urea as a reducing agent into a combustion exhaust gas containing nitrogen oxides, sulfur dioxides, metallic mercury, and hydrogen halides, and then introducing the combustion exhaust gas to a denitration apparatus filled with a denitration catalyst to cause a denitration reaction and oxidize the metallic mercury to produce a mercury halide; and introducing the combustion exhaust gas through an air preheater and an electric dust collector to a wet desulfurization apparatus, thereby removing sulfur dioxides and the mercury halide, wherein the ammonia concentration of the combustion exhaust gas at an exit of the denitration apparatus is maintained at 5 ppm or higher, and the mercury halide is adsorbed or precipitated onto combustion ash and collected by the electric dust collector to discharge the mercury halide out of a system.

According to this method, most of mercury in the combustion exhaust gas can be converted into a monovalent mercury halide by adding the reducing agent so that an unreacted portion thereof remains. The monovalent mercury halide is low in saturated vapor pressure and can be precipitated as a solid even at high temperatures. Particulates of the mercury halide are collected by the electric dust collector and removed from the combustion exhaust gas. That is, since the mercury halide can be collected by the electric dust collector rather than by the wet desulfurization apparatus to be affected by sulfite ions, it is possible to improve the rate of mercury removal from the combustion exhaust gas. As a result, the combustion exhaust gas from which mercury has been removed is introduced to the wet desulfurization apparatus. Consequently, it is possible to prevent the mercury chloride from being reduced to metallic mercury and released into the atmosphere.

In this case, the temperature of the combustion exhaust gas exhausted from the denitration catalyst is preferably reduced to, for example, 100° C. to 160° C. at which the monovalent mercury halide precipitates. Consequently, the precipitated amount of monovalent mercury halide can be increased, and therefore, the rate of mercury removal of the electric dust collector can be improved.

When at least one of ammonia and urea is used as the reducing agent, the injected amount of reducing agent is controlled, so that 5 ppm or more of the unreacted ammonia remains in the combustion exhaust gas on the exit side of the denitration apparatus. Consequently, the monovalent mercury halide can be produced in larger amounts.

When ammonia is used as the reducing agent, the injected amount of ammonia is controlled, so that an ammonia/nitrogen oxide ratio is 1 or higher. When urea is used as the reducing agent, the injected amount of urea is controlled, so that a urea×2/nitrogen oxide ratio is 1 or higher, since 1 mole of urea releases 2 moles of ammonia into the combustion exhaust gas. Consequently, the monovalent mercury halide can be produced in larger amounts since an unreacted reducing agent remains, and therefore, the rate of mercury removal in the combustion exhaust gas can be improved.

On the other hand, a combustion exhaust gas treatment apparatus of the present invention can be configured to include: addition means for adding a reducing agent to a combustion exhaust gas exhausted from a combustion apparatus and containing hydrogen halides and mercury; a denitration apparatus for introducing thereinto a combustion exhaust gas to which a denitrating agent is added, reducing nitrogen oxides in the presence of a denitration catalyst, and producing mercury halides by reacting mercury in the combustion exhaust gas with the hydrogen halides; control means for controlling the additive amount of denitrating agent, so that an unreacted denitrating agent remains in an exhaust gas exhausted from the denitration apparatus; an air preheater for reducing the temperature of acidic gas exhausted from the denitration apparatus to 100° C. to 160° C.; and an electric dust collector for removing ash dust containing the mercury halides from a combustion exhaust gas exhausted from the air preheater.

Advantageous Effects of Invention

According to the present invention, it is possible to improve the rate of mercury removal in a combustion exhaust gas.

BRIEF DESCRIPTION OF DRAWINGS

FIG. 3 is a drawing showing conditions of a practical example of the present invention;

FIG. 4 is a drawing showing precipitated amounts of mercury in Practical Example 1 and Comparative Example 1 of the present invention; and FIG. 5 is a drawing showing precipitated amounts of mercury in Practical Examples 2 to 5 and Comparative Example 2 of the present invention.

DESCRIPTION OF EMBODIMENTS

Hereinafter, the present invention will be described according to the embodiments thereof.

Embodiments

Figure 1:
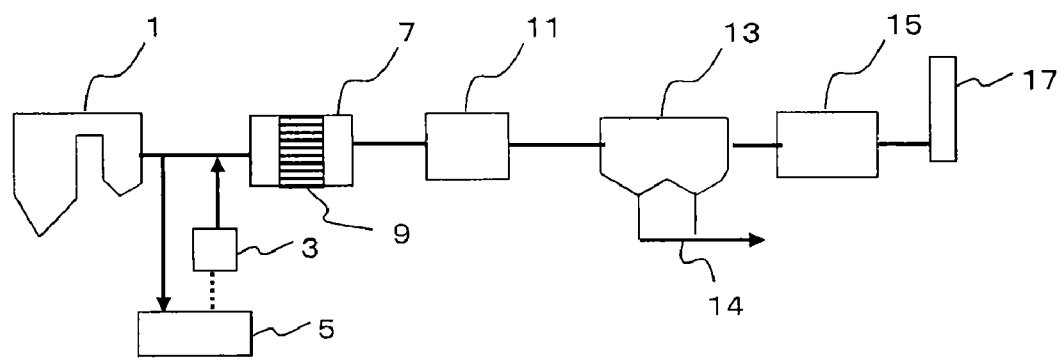
FIG. 1 is a block diagram of a combustion exhaust gas purifying apparatus according to one embodiment of the present invention.

FIG. 1 is a block diagram illustrating a combustion exhaust gas purifying apparatus according to one embodiment of the present invention. As illustrated in the figure, the present embodiment is an example in which the present invention is applied to a combustion exhaust gas purifying apparatus of a boiler 1 for burning coal or the like. An exhaust gas exhausted from the boiler 1 contains nitrogen oxides and sulfur oxides. This exhaust gas also contains hydrogen halides (for example, hydrogen chloride), metallic mercury, ash dust and the like. The exhaust gas exhausted from the boiler 1 is introduced to a denitration apparatus 7 filled with a denitration catalyst 9 to reduce the nitrogen oxides. The exhaust gas the nitrogen oxides of which have been reduced exchanges heat with the combustion air of the boiler at an air preheater 11 and is cooled to a predetermined temperature. The cooled exhaust gas is introduced to an electric dust collector 13. The exhaust gas from which ash dust has been collected mainly at the electric dust collector 13 is introduced to a wet desulfurization apparatus 15. The wet desulfurization apparatus 15 sprays an absorbing solution such as limestone slurry for absorbing sulfur oxides, for example, sulfur dioxide to the exhaust gas. The exhaust gas from which the sulfur oxides have been removed is exhausted from the smokestack 17 into the atmosphere.

Reducing agent addition means 3 for adding a reducing agent, such as ammonia or urea, to the exhaust gas is provided in an exhaust flue on the upstream side of a desulfurization apparatus 7. The reducing agent addition means 3 is adapted to be controlled by control means 5 for controlling the additive amount of reducing agent. In addition, an unillustrated nitrogen oxide detector for detecting the concentration of the nitrogen oxides in the exhaust gas exhausted from the boiler 1 is provided in the exhaust flue. The control means 5 is adapted to control the additive amount of reducing agent to a predetermined amount through the reducing agent addition means 3, according to a detected value of the nitrogen oxide detector.

A detailed configuration of an embodiment configured as described above will be described hereinafter, along with the operation thereof. A reducing agent is added to the exhaust gas by the reducing agent addition means 3. The exhaust gas to which the reducing agent has been added is introduced to the denitration apparatus 7 provided with the denitration catalyst 9. The nitrogen oxides in the exhaust gas are reduced by the reducing agent in the presence of the denitration catalyst 9 and are converted into a nitrogen gas. At this time, mercury and a hydrogen chloride in the exhaust gas react with each other in the presence of the denitration catalyst 9 to produce a mercury chloride. Here, a commonly-known Ti—Mo—V or Ti—W—V based denitration catalyst, for example, can be used as the denitration catalyst 9. Alternatively, a commonly-known denitration catalyst to which phosphorous has been added can be used, in order to prevent $SO_2$ in the denitration catalyst from being oxidized.

The exhaust gas exhausted from the denitration apparatus 7 is introduced to the air preheater 11 and reduced in temperature to, for example, 100° C. to 160° C. due to heat exchange with combustion air. Consequently, mercury chloride produced in the denitration apparatus 7 is condensed and converted into solid particulates. The exhaust gas exhausted from the air preheater 11 is introduced to the electric dust collector 13 which is a dust-collecting apparatus. The electric dust collector 13 collects particulates, such as ash dust, contained in the exhaust gas. The particulates, such as ash dust, collected by the electric dust collector 13 are discharged out of a system by an ash dust exhaust line 14 provided at a bottom of the electric dust collector 13.

The exhaust gas exhausted from the electric dust collector 13 flows into the wet desulfurization apparatus 15. The wet desulfurization apparatus 15 sprays an absorbing solution, such as limestone slurry, to the exhaust gas, to cause sulfur oxides in the exhaust gas to be absorbed by the absorbing solution and thus removed.

Next, a method of mercury removal characteristic of the present embodiment will be described specifically. The control means 5 detects the flow rate and the nitrogen oxide concentration of the exhaust gas exhausted from the boiler 1, in order to determine the reaction equivalent amount (stoichiometric amount of reaction) of the reducing agent necessary to reduce the nitrogen oxides in the exhaust gas. Then, the control means 5 controls the reducing agent addition means 3, so that the additive amount of reducing agent is equal to or larger than the reaction equivalent amount. For example, since a reaction between ammonia and nitrogen oxides is an equivalent mole reaction, the additive amount of ammonia is controlled so that an ammonia/nitrogen oxide ratio is 1 or higher. In addition, since urea releases 2 moles of ammonia into the exhaust gas, the additive amount of urea is controlled so that a urea/nitrogen oxide ratio is 0.5 or higher. Consequently, an unreacted reducing agent is allowed to remain in the reduction of the nitrogen oxides.

An exhaust gas to which the reducing agent has been added and which is at a temperature of, for example, 300° C. to 450° C. is introduced to the denitration apparatus 7. The denitration apparatus 7 reduces the nitrogen oxides in the exhaust gas to nitrogen in the presence of the denitration catalyst 9 by using the reducing agent. In addition, the denitration apparatus 7 causes mercury in the exhaust gas to react with hydrogen chloride to produce mercury chloride. At this time, if the additive amount of reducing agent is controlled so that an unreacted reducing agent remains in the reduction of the nitrogen oxides, monovalent mercury chloride (HgCl) can be produced in larger amounts than divalent mercury chloride ($HgCl_2$).

That is, both the monovalent mercury chloride and the divalent mercury chloride are produced in the presence of the denitration catalyst 9. Comparison between saturated vapor pressures of the two chlorides shows that at a temperature of, for example, 150° C., the saturated vapor pressure of the monovalent mercury chloride is on the order of $1 \times 10^{-15}$ Pa ($1 \times 10^{-17}$ atm), whereas the saturated vapor pressure of the divalent mercury chloride is on the order of 1 Pa ($1 \times 10^{-2}$ atm). This means that the monovalent mercury chloride can be precipitated as a solid even at higher temperatures, compared with the divalent mercury chloride, since the monovalent mercury chloride is low in saturated vapor pressure. Hence, the additive amount of reducing agent is controlled to be an equivalent or larger amount for reaction with the nitrogen oxides, so that the monovalent mercury chloride can be produced in larger amounts. Then, the temperature of the exhaust gas is reduced with the air preheater 11 to a temperature of, for example, 100° C. to 160° C., at which the monovalent mercury chloride can be precipitated. Thus, the monovalent mercury chloride is precipitated and adsorbed to ash dust. Consequently, mercury can be removed from the exhaust gas by collecting the ash dust with the electric dust collector 13.

Here, principles of the monovalent mercury chloride being produced in larger amounts will be described by taking an example in which ammonia is used as the reducing agent. In the presence of the denitration catalyst 9, there progress a reduction reaction of the nitrogen oxides (Formula 1 shown below) and a reaction between metallic mercury and the hydrogen chloride (Formulas 2 and 3 shown below).

$$NO+NH_3+1/4O_2 \rightarrow N_2+3/2H_2O \quad \text{(Formula 1)}$$

$$Hg+2HCl+1/2O_2 \rightarrow HgCl_2+H_2O \quad \text{(Formula 2)}$$

$$Hg+HCl+1/4O_2 \rightarrow HgCl+1/2H_2O \quad \text{(Formula 3)}$$

Since all of the reactions of (Formula 1) to (Formula 3) are oxidation reactions, a scramble for oxygen is present on surfaces of the denitration catalyst 9. With a smaller amount of ammonia, the reduction reaction of (Formula 1) finishes on the entry side of a denitration catalyst layer. Accordingly, oxygen overabounds on the exit side of the denitration catalyst layer, and the reaction of producing a divalent mercury chloride (Formula 2) becomes dominant. In contrast, under the condition that ammonia remains existent up to the exit of the denitration catalyst layer, in other words, under the condition that an unreacted reducing agent remains in the reduction reaction of nitrogen oxides, active oxygen reduces significantly due to the reduction reaction of (Formula 1) the reaction rate of which is fast. As a result, a reaction (Formula 3) in which a monovalent mercury chloride low in oxidation degree is produced is assumed to become dominant, and therefore, the monovalent mercury chloride is produced in larger amounts.

Then, the temperature of the exhaust gas exhausted from the denitration apparatus 7 is reduced by the air preheater 11 to a temperature of, for example, 100° C. to 160° C., at which the monovalent mercury chloride can be precipitated. Consequently, the monovalent mercury chloride low in saturated vapor pressure can be precipitated on surfaces of ash dust and the like in the exhaust gas. As a result, the monovalent mercury chloride is collected by the electric dust collector 13, along with the ash dust, and is removed from the exhaust gas. Then, an absorbing solution is sprayed by the wet desulfurization apparatus 15 to the exhaust gas from which the ash dust and the mercury chloride have been removed. Sulfur oxides in the exhaust gas are absorbed and removed by the absorbing solution. The exhaust gas exhausted from the wet desulfurization apparatus 15 is heated by an unillustrated reheater and is exhausted from the smokestack 17 into the atmosphere.

As described above, according to the present embodiment, a reaction equivalent or larger amount of reducing agent is added to the exhaust gas, so that an unreacted reducing agent remains, for example, so that the concentration of unreacted ammonia is 5 ppm or higher, thereby producing the monovalent mercury chloride in larger amounts. The monovalent mercury chloride is low in saturated vapor pressure and precipitates even at high temperatures. The precipitated mercury chloride can be collected by the electric dust collector 13 with the mercury adsorbed to the ash dust or in a state of particulates, and therefore, can be removed from the exhaust gas. As a result, the exhaust gas from which mercury has been removed is allowed to be introduced to the wet desulfurization apparatus 15. Thus, metallic mercury can be prevented from being released from the wet desulfurization apparatus 15.

That is, a method of mercury removal from a combustion exhaust gas according to the present embodiment comprises: injecting ammonia or urea as a reducing agent into a combustion exhaust gas containing mercury and hydrogen halides and introducing the combustion exhaust gas to a denitration apparatus; reducing nitrogen oxides in the combustion exhaust gas with the reducing agent in the presence of a denitration catalyst and reacting the mercury with the hydrogen halides in the combustion exhaust gas to convert the mercury into mercury halide; collecting ash dust in the combustion exhaust gas with an electric dust collector, and then spraying an absorbing solution to the combustion exhaust gas to allow sulfur oxides in the combustion exhaust gas to be absorbed to the absorbing solution, wherein the injected amount of reducing agent is controlled to maintain the concentration of ammonia in the combustion exhaust gas on the exit side of the denitration apparatus at 5 ppm or higher, so that the mercury halide is precipitated and collected by the electric dust collector.

Since mercury can be removed by the electric dust collector 13, and therefore, hardly enters the wet desulfurization apparatus 15, it is possible to reduce the mercury content of a calcium sulfate produced by the wet desulfurization apparatus 15.

Note that an upper limit of the additive amount of reducing agent is set as appropriate, so that an unreacted reducing agent is not released to the atmosphere.

Figure 2:
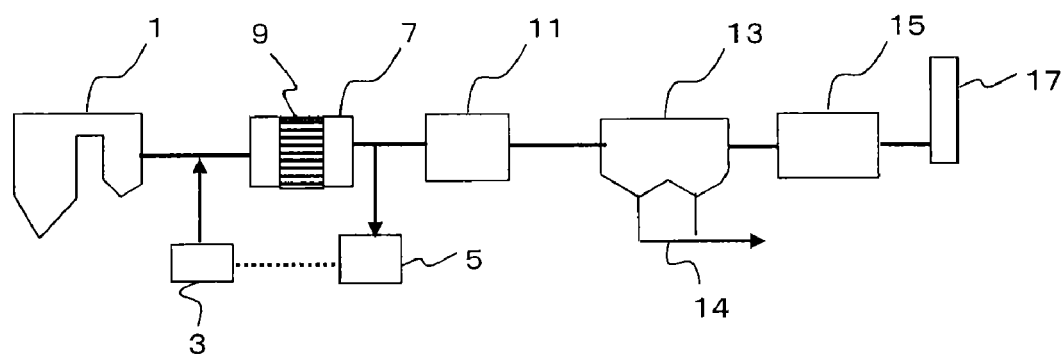
FIG. 2 is a block diagram illustrating a method for controlling a reducing agent according to another embodiment of the present invention.

If ammonia or urea is used as the reducing agent, a detector for detecting an ammonia concentration may be provided on the exit side of the denitration apparatus 7, as illustrated in FIG. 2, instead of detecting the concentration of nitrogen oxides in the exhaust gas exhausted from the boiler 1. Thus, the additive amount of reducing agent can be controlled on the basis of a detected value of the detector. In this case, the additive amount of reducing agent is controlled, so as to be able to maintain an ammonia concentration on the exit side of the denitration apparatus 7 at 5 ppm or higher, preferably 10 ppm or higher.

EXAMPLES

Hereinafter, examples of the present invention will be described. Note that in Practical Example 1, a quartz tube, 3 mm in outer diameter, 2 mm in inner diameter, and 30 cm in length, corresponding to the dimensions of a quartz reaction tube filled with a denitration catalyst was connected to the quartz reaction tube. In addition, an apparatus in which a phosphate buffer solution absorption bulb filled with a phosphate buffer solution was connected to the quartz tube was used. A heat-insulating material and a ribbon heater were fitted on outer surfaces of the quartz tube, so as to be able to reduce the temperature of an acidic exhaust gas introduced into the quartz tube from 350° C. to 100° C. That is, the quartz reaction tube corresponds to the denitration apparatus 7, the quartz tube corresponds to the air preheater 11, and the phosphate buffer solution absorption bulb corresponds to the wet desulfurization apparatus 15.

For the denitration catalyst of Practical Example 1, 900 g of titanium oxide (specific surface area: 290 m$^2$/g), 107 g of ammonium molybdate, 42.5 g of ammonium metavanadate, 404 g of a silica sol, and 50 g of water were put in a kneader and kneaded for 60 minutes. Then, the mixture was kneaded for 30 minutes, while gradually adding 151 g of silica alumina-based ceramic fiber, thereby obtaining catalyst paste of 27% in water content. The catalyst paste was placed on a 0.7 mm-thick base material formed by processing a 0.2 mm-thick SUS 430 steel plate into a metal lath. The base material on which the catalyst paste was placed was held between two polyethylene sheets and threaded through a pair of pressure rollers, so that the catalyst paste filled the meshes of the base material. This base material was air-dried, and then calcinated at 500° C. for two hours to obtain a denitration catalyst. The composition of this denitration catalyst was Ti/Mo/V=93/5/2 in atomic ratio. Three sheets of this plate-like denitration catalyst formed by cutting the catalyst into a 20 mm×100 mm size were filled into the quartz reaction tube. Under conditions shown in FIG. 3, the exhaust gas was absorbed into this denitration catalyst at a rate of 1 liter/min, to cause a reduction reaction of nitrogen oxides and an oxidation reaction between mercury and hydrogen chloride. The obtained denitration catalyst was defined as Practical Example 1. In addition, a denitration catalyst to which an exhaust gas not containing ammonia in a gas composition shown in FIG. 3 was absorbed under the same conditions as those of Practical Example 1 was defined as Comparative Example 1. Note that mercury was analyzed according to an analysis method compliant to JIS K-0222 by washing the quartz tube with a potassium permanganate solution and retrieving precipitated mercury. In addition, a phosphate buffer solution after the flow of an exhaust gas was analyzed according to an analysis method compliant to JIS K-0222, to detect mercury.

FIG. 4 shows results obtained for Practical Example 1 and Comparative Example 1. It is understood that as shown in the figure, the precipitated amount of mercury is larger in Practical Example 1 in which unreacted ammonia remains than in Comparative Example 1. That is, since mercury precipitated at the quartz tube corresponds to a monovalent mercury chloride low in saturated vapor pressure, it can be said that the monovalent mercury chloride was produced in larger amounts in Practical Example 1. In contrast, the amount of mercury precipitated at the quartz tube is small in Comparative Example 1 to which no ammonia was added. Thus, it can be said that the monovalent mercury chloride was hardly produced at all. Since the produced amount of monovalent mercury chloride is large in Practical Example 1, mercury can be precipitated as a solid even at high temperatures. Thus, mercury can be removed in large amounts by the dust-collecting apparatus. In contrast, mercury is hardly precipitated at all in Comparative Example 1, but is absorbed in large amounts into the phosphate buffer solution corresponding to the absorbing solution of the wet desulfurization apparatus. Accordingly, if the comparative example 1 is applied to an actual apparatus, mercury chlorides will be reduced to metallic mercury. Thus, it can be said that the comparative example 1 is low in mercury removal rate.

Next, Practical Examples 2 to 5 will be described. Practical Examples 2 to 5 differ from Practical Example 1 in the composition of a denitration catalyst and the additive amount of ammonia. The rest of configuration is the same as that of Practical Example 1, and therefore, will not be described again here.

For the denitration catalysts of Practical Example 2 to 5, 900 g of titanium oxide (specific surface area: 290 m$^2$/g), 107 g of ammonium molybdate, 28.3 g of ammonium metavanadate, 68.3 g of 85% phosphoric acid, 404 g of silica sol, and 50 g of water were put in a kneader and kneaded for 60 minutes. Then, the mixture was kneaded for 30 minutes, while gradually adding 151 g of silica alumina-based ceramic fiber, thereby obtaining catalyst paste of 27% in water content. The catalyst paste was placed on a 0.7 mm-thick base material formed by processing a 0.2 mm-thick SUS 430 steel plate into a metal lath. The base material on which the catalyst paste was placed was held between two polyethylene sheets and threaded through a pair of pressure rollers, so that the catalyst paste filled the meshes of the base material. This base material was air-dried, and then calcinated at 500° C. for two hours to obtain a denitration catalyst. The composition of this denitration catalyst was Ti/Mo/V=93/5/2 and P/(Mo+V)=0.5 in atomic ratio. An acidic exhaust gas was introduced to this denitration catalyst, while varying the ammonia/nitrogen oxide ratio of the exhaust gas among a plurality of ratios. Practical Example 2 was set to an ammonia/nitrogen oxide ratio of 1.2, Practical Example 3 was set to an ammonia/nitrogen oxide ratio of 1.1, Practical Example 4 was set to an ammonia/nitrogen oxide ratio of 1.0, and Practical Example 5 was set to an ammonia/nitrogen oxide ratio of 0.9. In addition, Comparative Example 2 was set to an ammonia/nitrogen oxide ratio of 0.5.

FIG. 5 shows results obtained for Practical Examples 2 to 5 and Comparative Example 2. It is understood that as shown in the figure, the amount of mercury precipitated at the quartz tube increases as the amount of ammonia in an exhaust gas exhausted from the denitration catalyst increases. That is, if unreacted ammonia increases due to the reduction reaction of nitrogen oxides, the precipitated amount of mercury increases. Thus, it can be said that monovalent mercury chloride was produced in larger amounts. In contrast, the concentration of unreacted ammonia is no higher than 2 ppm in Comparative Example 2, and the precipitated amount of mercury is small. Thus, divalent mercury chloride higher in saturated vapor pressure than the monovalent mercury chloride is considered to have been produced in larger amounts.

In addition, the precipitated amount of mercury intercorrelates with the amount of unreacted ammonia. Accordingly, the rate of mercury removal can be improved by increasing the unreacted ammonia. Note that a large amount of mercury was precipitated also in Practical Example 5. Consequently, the monovalent mercury chloride can be produced in large amounts by controlling the additive amount of ammonia so that the concentration of the unreacted ammonia is 5 ppm or higher. Thus, mercury can be collected and removed by the dust-collecting apparatus.

The invention claimed is:

1. A method for removing mercury in a combustion exhaust gas, comprising:
   injecting ammonia or urea as a reducing agent into a combustion exhaust gas containing nitrogen oxides, sulfur dioxide, metallic mercury, and hydrogen halides, and then introducing the combustion exhaust gas to a denitration apparatus filled with a denitration catalyst to cause a denitration reaction and oxidize the metallic mercury to produce mercury halide; and
   introducing the combustion exhaust gas through an air preheater and an electric dust collector to a wet desulfurization apparatus, thereby removing the sulfur dioxide and the mercury halide,
   wherein an ammonia concentration of the combustion exhaust gas at an exit of the denitration apparatus is maintained at 5 ppm or higher, and the mercury halide is adsorbed or precipitated onto combustion ash and collected by the electric dust collector to discharge the mercury halide out of a system.

2. The method for removing mercury in a combustion exhaust gas according to claim 1, wherein an amount of ammonia or urea to be injected into the combustion exhaust gas is controlled, so that an ammonia/nitrogen oxide ratio is 1 or higher or a urea x 2/nitrogen oxide ratio is 1 or higher.

3. A combustion exhaust gas purifying apparatus for carrying out a method for removing mercury in a combustion exhaust gas according to claim 1, comprising:
   a denitration apparatus;
   an air preheater;
   an electric dust collector;
   a wet desulfurization apparatus;
   measuring unit configured to measure an ammonia concentration of the combustion exhaust gas at an exit of the denitration apparatus; and
   controlling unit configured to control the injected amount of ammonia or urea at an entry of the denitration apparatus according to a signal from the measuring unit.

4. A combustion exhaust gas purifying apparatus for carrying out a method for removing mercury in a combustion exhaust gas according to claim 2, comprising:
   a denitration apparatus;
   an air preheater;
   an electric dust collector;
   a wet desulfurization apparatus;
   measuring unit configured to measure an ammonia concentration of the combustion exhaust gas at an exit of the denitration apparatus; and
   controlling unit configured to control the injected amount of ammonia or urea at an entry of the denitration apparatus according to a signal from the measuring unit.

* * * * *